United States Patent
Bringuier et al.

(10) Patent No.: US 7,983,520 B2
(45) Date of Patent: Jul. 19, 2011

(54) METHODS OF MAKING OPTICAL FIBER ASSEMBLIES HAVING RELATIVELY LOW-LEVELS OF WATER-SWELLABLE POWDER

(75) Inventors: Anne G. Bringuier, Taylorsville, NC (US); Warren W. McAlpine, Hickory, NC (US); Christopher M. Quinn, Hickory, NC (US); John A. Rowe, Winston Salem, NC (US); Dave A. Seddon, Hickory, NC (US); Catharina L. Tedder, Catawba, NC (US); Gilbert D. Tugman, Winston-Salem, NC (US); Brian S. Witz, Greensboro, NC (US); George Ndayizeye, Charlotte, NC (US)

(73) Assignee: Corning Cable Systems LLC, Hickory, NC (US)

( * ) Notice: Subject to any disclaimer, the term of this patent is extended or adjusted under 35 U.S.C. 154(b) by 77 days.

(21) Appl. No.: 12/548,952

(22) Filed: Aug. 27, 2009

(65) Prior Publication Data

US 2010/0001420 A1     Jan. 7, 2010

Related U.S. Application Data

(62) Division of application No. 11/821,933, filed on Jun. 26, 2007, now Pat. No. 7,630,605.

(51) Int. Cl.
    *G02B 6/44*      (2006.01)
(52) U.S. Cl. .................. 385/100; 385/109; 385/114
(58) Field of Classification Search ............ 385/100–114
See application file for complete search history.

(56) References Cited

U.S. PATENT DOCUMENTS

| | | | |
|---|---|---|---|
| 3,538,235 A | 11/1970 | Arendt et al. .................... 174/23 |
| 4,002,819 A | 1/1977 | Woytiuk ........................ 174/23 |
| 4,004,077 A | 1/1977 | Woytiuk ........................ 174/23 |
| 4,419,157 A | 12/1983 | Ferrentino ...................... 156/56 |
| 4,441,787 A | 4/1984 | Lichtenberger ............ 350/96.23 |

(Continued)

FOREIGN PATENT DOCUMENTS

EP     0784220 A1    7/1997

(Continued)

OTHER PUBLICATIONS

Rosendahl Austria Cable Manufacturing Systems website http://www.rosendahlaustria.com, "Dry Tube Production—a clenching concept"; printed on Apr. 17, 2008.

(Continued)

*Primary Examiner* — Daniel Petkovsek
(74) *Attorney, Agent, or Firm* — C. Keith Montgomery

(57) ABSTRACT

Disclosed are fiber optic assemblies having at least one optical fiber and a water-swellable powder within a tube and/or cavity and methods for making the same. Fiber optic assemblies of the present invention use relatively low-levels of water-swellable powder while still effectively blocking the migration of tap water and/or saline solutions of 3% by weight along the tube and/or cavity. Furthermore, cleaning of the optical fibers is not necessary before connectorization like with conventional fiber optic cables that use a gel or grease. Generally speaking, at least some of the water-swellable powder is transferred to the inside surface of the tube, cavity, optical fiber or the like; rather, than being a loose powder that is able to migrate within the tube or cavity. Moreover, the existence of water-swellable powder within the fiber optic assembly or cable is nearly transparent to the craft since relatively low-levels are possible.

9 Claims, 5 Drawing Sheets

U.S. PATENT DOCUMENTS

| | | | |
|---|---|---|---|
| 4,535,098 A | 8/1985 | Evani et al. | 521/149 |
| 4,596,443 A | 6/1986 | Diemeer et al. | 350/96.23 |
| 4,909,592 A | 3/1990 | Arroyo et al. | 350/96.23 |
| 5,010,209 A | 4/1991 | Marciano-Agostinelli et al. | 174/23 C |
| 5,049,593 A | 9/1991 | Marciano-Agostinelli et al. | 523/173 |
| 5,075,373 A | 12/1991 | Takemori et al. | 525/57 |
| 5,179,611 A | 1/1993 | Umeda et al. | 385/100 |
| 5,261,021 A | 11/1993 | Pasta et al. | 385/100 |
| 5,296,650 A | 3/1994 | Kobayashi et al. | 174/12 |
| 5,321,788 A | 6/1994 | Arroyo et al. | 385/109 |
| 5,335,302 A | 8/1994 | Polle | 385/100 |
| 5,388,175 A | 2/1995 | Clarke | 385/100 |
| 5,410,629 A | 4/1995 | Arroyo | 385/109 |
| 5,689,601 A | 11/1997 | Hager et al. | 385/100 |
| 5,698,615 A | 12/1997 | Polle | 523/173 |
| 5,740,295 A | 4/1998 | Kinard et al. | 385/109 |
| 5,751,880 A | 5/1998 | Gaillard | 385/109 |
| 6,178,278 B1 | 1/2001 | Keller et al. | 385/109 |
| 6,253,012 B1 | 6/2001 | Keller et al. | 385/109 |
| 6,304,701 B1 | 10/2001 | Bringuier et al. | 385/106 |
| 6,493,491 B1 | 12/2002 | Shen et al. | 385/113 |
| 6,500,541 B1 | 12/2002 | Schoeck, Jr. et al. | 428/372 |
| 6,504,979 B1 | 1/2003 | Norris et al. | 385/109 |
| 6,567,592 B1 | 5/2003 | Gimblet et al. | 385/113 |
| 6,577,796 B2 | 6/2003 | Anelli et al. | 385/112 |
| 7,539,380 B1 | 5/2009 | Abernathy et al. | 385/100 |
| 7,630,605 B2 * | 12/2009 | Bringuier et al. | 385/100 |
| 2002/0159726 A1 | 10/2002 | Brown et al. | 385/109 |
| 2003/0206705 A1 | 11/2003 | McAlpine et al. | 385/110 |
| 2008/0031580 A1 | 2/2008 | Keller et al. | 385/113 |
| 2010/0080521 A1 | 4/2010 | Bardroff et al. | 385/102 |

FOREIGN PATENT DOCUMENTS

| | | |
|---|---|---|
| EP | 0784220 B1 | 3/2006 |
| JP | 50-147745 | 11/1975 |
| JP | 8-304675 | 11/1996 |
| JP | 2005-148373 | 6/2005 |
| JP | 10-148739 | 6/2010 |
| WO | WO 00/21098 | 4/2000 |
| WO | WO 2006/105034 A1 | 10/2006 |
| WO | WO 2008/027202 A2 | 3/2008 |

OTHER PUBLICATIONS

TIA Document: "FOTP 82-B Fluid Penetration Test for Fluid-Blocked Fiber Optic Cable", TIA-455-82-B (Revision if EIA/TIA-455-82-A), Jun. 2003.

Optoelectronic Industry and Technology Development Association (Japan), Technical Paper, TP-BW01-2007, "Optical Fiber Distribution System for Detached Houses in FTTH", Jul. 2007, 20 pgs.

Fujikura Ltd., Product Specification Sheet, "DC01 / Drop Cable", 2003, 1 pg.

* cited by examiner

METHODS OF MAKING OPTICAL FIBER ASSEMBLIES HAVING RELATIVELY LOW-LEVELS OF WATER-SWELLABLE POWDER

RELATED APPLICATIONS

This application is a divisional application of application Ser. No. 11/821,933, filed Jun. 26, 2007, now U.S. Pat. No. 7,630,605, the entire contents of which are hereby incorporated by reference. This application is related to application Ser. No. 12/221,118, filed Jul. 31, 2008, application Ser. No. 13/030,807, filed Feb. 18, 2011, and application Ser. No. 13/020,174, filed Feb. 3, 2011.

TECHNICAL FIELD

The present disclosure relates generally to optical fiber assemblies used for transmitting optical signals. More particularly, the present disclosure relates to optical fiber assemblies having relatively low-levels of water-swellable powder along with methods for making optical fiber assemblies.

BACKGROUND

Communications networks are used to transport a variety of signals such as voice, video, data and the like. As communications applications required greater bandwidth, communication networks switched to cables having optical fibers since they are capable of transmitting an extremely large amount of bandwidth compared with a copper conductor. Moreover, a fiber optic cable is much smaller and lighter compared with a copper cable having the same bandwidth capacity. However, optical fibers are relatively sensitive compared with copper conductors and preserving their optical performance can be challenging.

In certain applications, fiber optic cables are exposed to moisture that over time may enter the fiber optic cable. To address this moisture issue, fiber optic cables intended for these applications include one or more components for blocking the migration of water along the fiber optic cable. By way of example, conventional fiber optic cables block water migration using a filling and/or a flooding material such as gel or grease within the fiber optic cable. Filling material refers to gel or grease that is inside a tube with the optical fibers, whereas flooding material refers to gel or grease within the cable that is outside of the tube(s) that houses the optical fibers. The gel or grease works by filling the spaces (i.e., the voids) so that the water does not have a path to follow within the fiber optic cable. Additionally, the gel or grease filling material has other advantages besides water blocking, such as cushioning and coupling of the optical fibers which assists in maintaining optical performance during mechanical or environmental events affecting the fiber optic cable. Simply stated, the gel or grease filling material is multi-functional.

However, gel or grease filling materials also have disadvantages. For instance, the gel or grease is messy and may drip from an end of the fiber optic cable. Another disadvantage is that the filling material must be cleaned from the optical fibers when being prepared for an optical connection, which adds time and complexity for the craft. Moreover, cleaning the gel or grease requires the craft to carry the cleaning materials into the field for removing the gel or grease. Thus, there has been a long-felt need for fiber optic cables that eliminate the gel or grease materials while still providing all of the benefits associated therewith.

Early fiber optic cable designs eliminated the flooding material by using dry water-blocking components such as tapes or yarn outside the buffer tubes for inhibiting the migration of water along the cable. Unlike the gel or grease, the dry water-blocking components are not messy and do not leave a residue that requires cleaning. These dry water-blocking components typically include super absorbent polymers (SAPs) that absorb water and swell as a result, thereby blocking the water path for inhibiting the migration of water along the fiber optic cable. Generally speaking, the water-swellable components used a yarn or tape as a carrier for the SAP. Since the water-swellable yarns and tapes were first used outside the tubes housing the optical fibers, the other functions besides water-blocking such as coupling and optical attenuation did not need to be addressed.

Eventually, fiber optic cables used water-swellable yarns and tapes within the tubes that housed the optical fibers for replacing the gel or grease filling materials. Generally speaking, the water-swellable yarns or tapes had sufficient water-blocking capabilities, but did not provide all of the functions of the gel or grease filling materials such as cushioning and coupling. For instance, the water-swellable tape and yarns are bulky since they are relatively large compared with a typical optical fiber and/or can have a relatively rough surface. As a result, water-swellable yarns or tapes may cause problems if the optical fiber is pressed against the same. Stated another way, optical fibers pressed against the conventional water-swellable yarn may experience microbending which can cause undesirable levels of optical attenuation and/or cause other issues. Moreover, the desired level of coupling for the optical fibers with the tube may be an issue if the fiber optic cable is not a stranded design since the stranding provides coupling.

By way of example, U.S. Pat. No. 4,909,592 discloses one example of conventional water swellable components used within a buffer tube having optical fibers. But, including conventional water-swellable components within the buffer tube can still cause issues with fiber optic cable performance that requires limitations on use and/or other design alterations. For instance, fiber optic cables using conventional water-swellable yarns within the buffer tube required larger buffer tubes to minimize the interaction of conventional water swellable yarns and optical fibers and/or limiting the environment where the cable is used.

Other early fiber optic cable designs used tubes assemblies that were highly-filled with SAPs as a loose powder for blocking the migration of water within the fiber optic cable. However, using a loose water-swellable powder within the fiber optic cable created problems since the SAPs powders could accumulate/migrate at positions within the fiber optic cable since it was not attached to a carrier such as a yarn or tape (i.e., SAPs powders would accumulate at the low points when wound on a reel due to gravity and/or vibration), thereby causing inconsistent water blocking within the fiber optic cable. Also, the loose water-swellable powder was free to fall out of the end of the tube. FIGS. 1 and 2 respectively depict a cross-sectional view and a longitudinal cross-sectional view of a conventional dry fiber optic assembly 10 having a plurality of optical fibers 1 along with a water-swellable powder 3 as schematically represented disposed within a tube 5. As shown, conventional dry fiber optic assembly 10 uses a relatively large quantity of water-swellable powder 3 within tube 5 for blocking the migration of water therein. To reduce the amount of water-swellable powder other fiber optic cable designs have used water-swellable powders in combination with other cable components for effective water-blocking such as disclosed in U.S. Pat. No. 6,253,012.

SUMMARY

The present embodiments are directed to dry fiber optic assemblies that use a relatively low-level of water-swellable powder for blocking the migration water of along the same. The fiber optic assemblies include one or more optical fibers and a water-swellable powder disposed within a tube, a cavity, a cable, or the like. Moreover, one or more of the fiber optic assemblies may be used in a cable or may itself form a cable. Additionally, embodiments of the present invention can effectively block the migration of tap water or saline water such as 3% by weight.

One aspect is directed to a fiber optic assembly having at least one optical fiber and a water-swellable powder disposed within a tube where the tube has an inner diameter of about 2.0 millimeters or less. The water-swellable powder is disposed within the tube for blocking the migration of water within a length of the tube with an average concentration of about 0.02 grams or less per meter of the fiber optic assembly. Further, the fiber optic assembly is capable of blocking a one-meter pressure head of tap water in a one-meter length of the tube for twenty-four hours.

Another aspect is directed to a fiber optic assembly such as a stranded loose tube fiber optic cable having a plurality of tubes, at least one optical fiber being disposed within one of the plurality of tubes, thereby forming a tube assembly. A water-swellable powder is disposed within the tube assembly for blocking the migration of water within a length of the respective tube assembly, wherein the water-swellable powder has an average concentration of about 0.02 grams or less per meter of the tube assembly. The tube assembly is capable of blocking a one-meter pressure head of tap water in a one-meter length of the tube for twenty-four hours. Additionally, the fiber optic assembly has a cable jacket that generally surrounds the plurality of tubes.

Another aspect is directed to a fiber optic assembly where the concentration of water-swellable powder within a cavity of a tube or the like is scaled to the size of the cavity. This fiber optic assembly includes at least one optical fiber disposed within a tube, where the tube has a cavity cross-sectional area measured in square millimeters, and a water-swellable powder disposed within the tube for blocking the migration of water within a length of the tube. The water-swellable powder has a normalized concentration of about 0.01 grams or less per meter length of the assembly per square millimeter of the cavity cross-sectional area for calculating an average concentration of the water-swellable powder in grams per meter length for blocking a one-meter pressure head of tap water in a one-meter length for twenty-four hours.

Still another aspect is directed to a method of making a fiber optic assembly comprising the steps of providing at least one optical fiber, applying a water-swellable powder to the at least one optical fiber, and applying a tube about the at least one optical fiber and the water-swellable powder, wherein the water-swellable powder has an average concentration of about 0.02 grams or less per meter within the cavity of the tube. Additionally, methods according to the invention can optionally include other steps such as applying strength members, coupling elements, and/or passing the optical fiber(s) past an ionizer.

Additionally, another aspect is directed to a method of making a fiber optic cable comprising the steps of providing at least one optical fiber, applying a water-swellable powder to the at least one optical fiber, providing a first strength member and a second strength member and applying a tube about the at least one optical fiber and the water-swellable powder. The first strength member and second strength member are attached to the tube and may even be encapsulated by the tube. The first strength member and the second strength member are elastically strained while applying the tube during manufacturing, thereby creating a predetermined level of excess fiber length in the at least one optical fiber.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principals and operations of the invention.

DETAILED DESCRIPTION

The present invention has several advantages compared with conventional dry fiber optic assemblies that use water-swellable powder. One advantage is that fiber optic assemblies of the present invention use relatively low-levels of water-swellable powder while still effectively blocking the migration of water along the same. Moreover, the existence of water-swellable powder within the fiber optic assembly or cable is nearly transparent to the craft since low-levels are required. Additionally, no cleaning of the optical fibers is necessary before connectorization like with gel or grease and no components such as water-swellable tapes or yarns require removing or cutting. Another advantage of the present invention is that the water-swellable powder is, generally speaking, transferred and/or primarily attached to the inside surface of the tube, cavity, optical fiber or the like; rather, than being a loose powder that is able to migrate within the tube or cavity. In other words, the water-swellable powder is in contact with the inner surface of the tube or cavity and essentially does not fallout due to gravity, but instead requires wiping, blowing, or other agitation to remove a majority thereof. Additionally, the tubes or cavities of the fiber optic assemblies can have smaller dimensions than conventional dry cable assemblies that use tape or yarns. As used herein, fiber optic assemblies include tube assemblies that exclude strength members, tubes assemblies having strength members, fiber optic cables, and the like.

Figure 1:
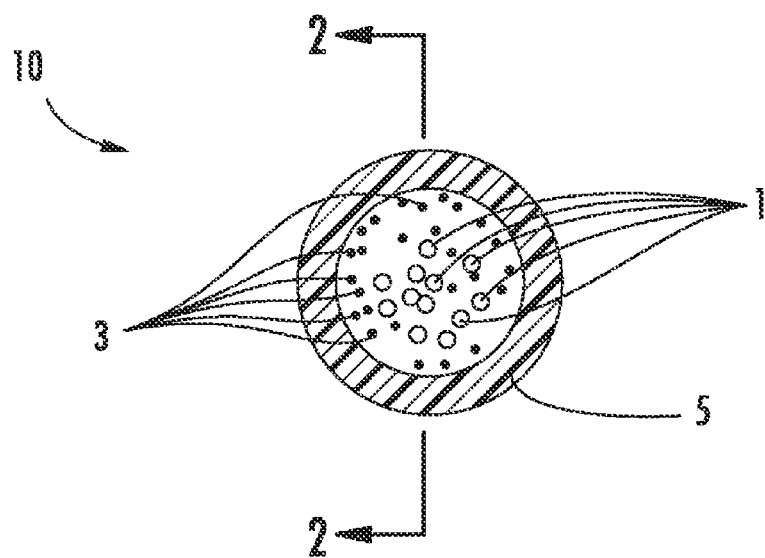
FIG. 1 is a cross-sectional view of the conventional fiber optic assembly using a relatively large quantity of water-swellable powder for blocking the migration of water.
Figure 2:
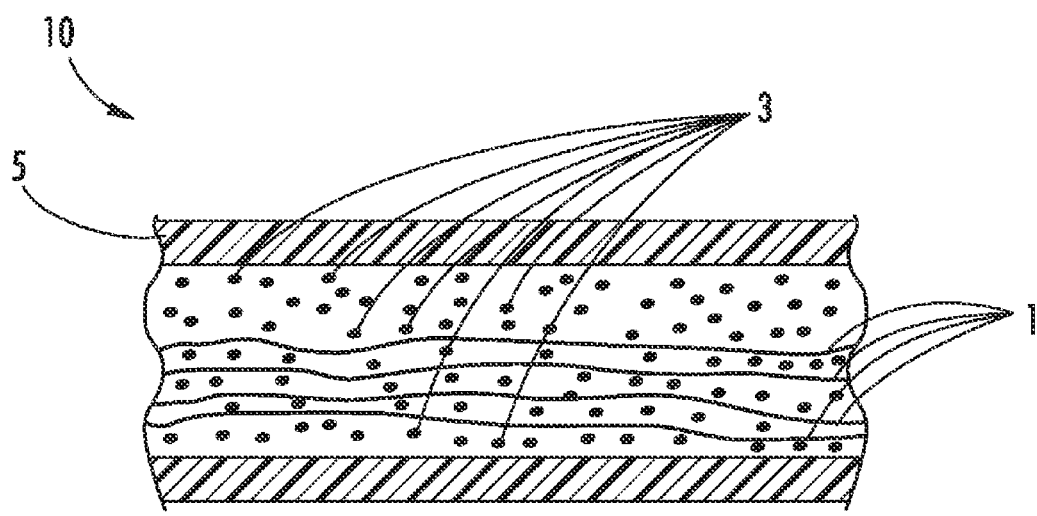
FIG. 2 is a longitudinal cross-sectional view of the conventional fiber optic assembly of FIG. 1.
Figure 3:
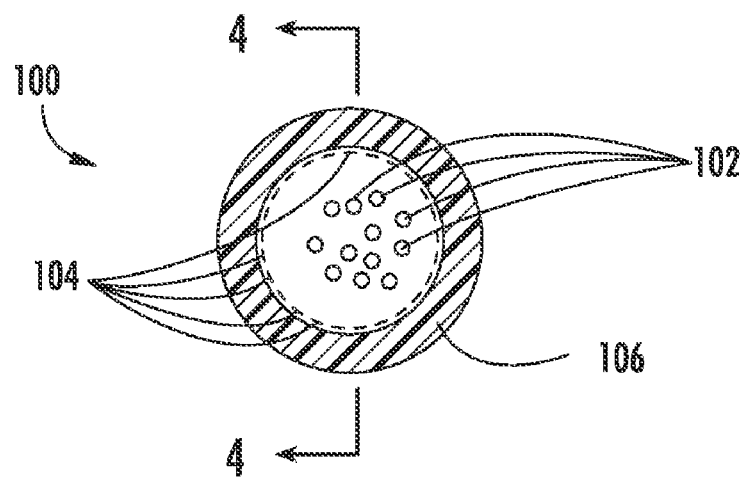
FIG. 3 is a cross-sectional view and a fiber optic assembly using a relatively low-level of water-swellable powder for blocking the migration of water.
Figure 4:
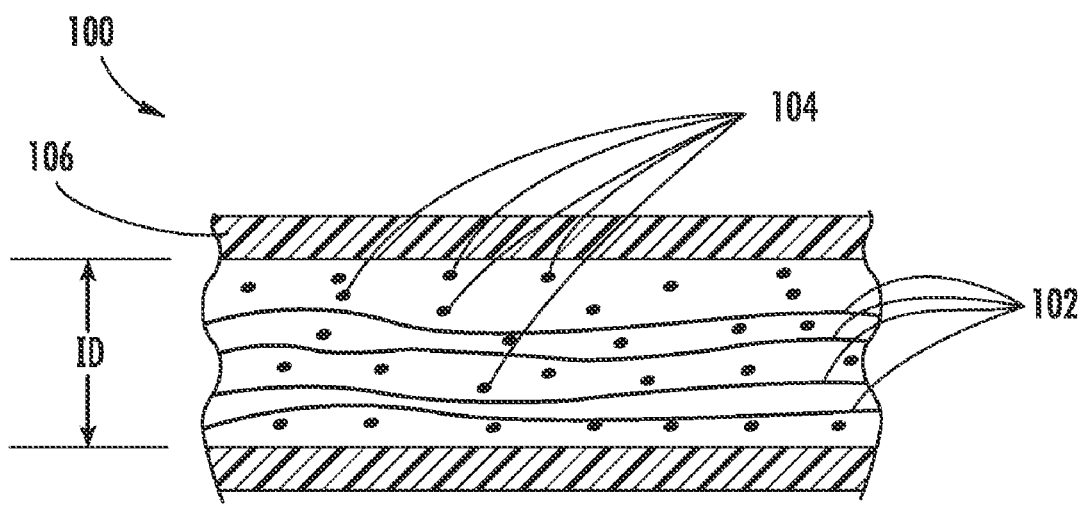
FIG. 4 is a longitudinal cross-sectional view of the fiber optic assembly of FIG. 3.

Reference will now be made in detail to the present preferred embodiments of the invention, examples of which are illustrated in the accompanying drawings. Whenever possible, the same reference numerals will be used throughout the drawings to refer to the same or like parts. FIGS. 3 and 4 respectively depict a cross-sectional and longitudinal cross-sectional view of a fiber optic assembly 100 (i.e., a tube assembly) according to the present invention. Fiber optic assembly 100 includes a plurality of optical fibers 102, and a water-swellable powder 104, and a tube 106. Optical fibers 102 may be any suitable type of optical waveguide as known or later developed. Moreover, the optical fibers may be a portion of a fiber optic ribbon, a bundle of optical fiber or the like. In this embodiment, optical fibers 102 are colored by an outer layer of ink (not visible) for identification and are loosely disposed within tube 106. In other words, optical fibers 102 are non-buffered, but the concepts of the present invention may be used with optical fibers having other configurations such as buffered, ribbonized, etc. As shown, water-swellable powder 104 is, generally speaking, uniformly disposed about the inner surface of tube 106 due to the method of making fiber optic assembly 100 as discussed herein. Further, water-swellable powder 104 has a relatively small average concentration per meter so that its use in the fiber optic assembly 100 is nearly transparent to the craft, but is surprisingly effective since it provides adequate water-blocking performance. Additionally, fiber optic assembly 100 does not include another component for blocking the migration of water within tube 106.

Unlike conventional fiber optic tube assemblies, fiber optic tube assemblies use a relatively low-level of water-swellable powder 104 while still being able to block a one-meter pressure head of tap water within a one meter length for twenty-four hours. As used herein, tap water is defined as water having a saline level of 1% or less by weight. Similarly, fiber optic tube assemblies of the present invention can also block saline solutions up to 3% by weight using the same low-levels of water-swellable powder within 3 meters for 24 hours, and the blocking performance may even stop the 3% saline solution within about 1 meter for 24 hours depending on the design. By way of example, water-swellable powder 104 has an average concentration of about 0.02 grams or less per meter of the fiber optic assembly 100, where tube 106 has an inner diameter of about 2.0 millimeters or less. Additionally, the concepts of the present invention are scalable, for instance, a cavity cross-sectional area for the 2.0 millimeter inner diameter tube is about 3.14 square millimeters, thereby yielding a normalized concentration value of about 0.01 grams of water-swellable powder per meter length of the tube assembly (i.e., the normalized concentration per square millimeter of cavity cross-sectional area is given by taking the average concentration of 0.02 grams per meter length of water-swellable powder divided by the cavity cross-sectional area of about 3 square millimeters to yield a normalized concentration value of about 0.01 grams of water-swellable powder per square millimeter of the cavity cross-sectional area of the tube when rounded upward). Consequently, the average concentration in grams per meter of water-swellable powder for cavities of tubes or fiber optic cables having a predetermined cross-sectional area can be scaled (i.e., calculated) accordingly by using the normalized concentration value such as of 0.01 grams of water-swellable powder per meter length for each square millimeter of cavity cross-sectional area. In further embodiments, the water-swellable powder may have a lower value for the average concentration of water-swellable powder such as of about 0.01 grams or less per meter of the fiber optic assembly 100 with a tube having a similar inner diameter of 2.0 millimeters, which yields a lower normalized concentration value of about 0.004 grams of water-swellable powder per square millimeter of the cavity cross-sectional area of the tube when rounded upward. Simply stated, as the cross-sectional area of the cavity of the tube or the like increases the amount of water-swellable powder needed for effectively blocking the migration of water along the same can increase generally proportionately as discussed herein.

The weight of the water-swellable powder in the fiber optic assembly is calculated by using the following procedure. A representative number of samples such as five one meter samples of the fiber optic tube assemblies are cut from the assembly being tested. The samples are preferably taken from different longitudinal portions along the fiber optic assembly rather than serially cutting samples from the same. Each one-meter sample is weighed with the optical fibers and water-swellable powder in the tube for determining a total weight of the sample using a suitably precise and accurate scale. Thereafter, the optical fibers (along with any other removable cable components within the tube, cavity, or the like) are pulled from the tube. The optical fibers (and any other cable components) are wiped with a fine tissue to remove any water-swellable powder thereon then the optical fibers (and other cable components) are weighed to determine their weight without the water-swellable powder. Next, the tube is opened up along its longitudinal length using a suitable tool so that the water-swellable powder therein can be wiped from the tube taking care to make sure that it is all substantially removed, then the wiped tube is weighed to determine its weight without the water-swellable powder. Thereafter, the sum of the weight of the optical fiber (and other cable components) along with the weight of the tube is subtracted from the total weight for the sample to determine the weight of the water-swellable powder in the respective sample. This procedure is repeated for each of the representative number of samples. The average concentration of water-swellable powder is calculated by adding all of the calculated weights of the water-swellable powders for the samples and dividing by the number of samples, thereby arriving at an average concentration of the water-swellable powder per meter for the fiber optic assembly.

Besides water-blocking with relatively low-levels of water-swellable powder, fiber optic tube assemblies and/or cables of the present invention such as fiber optic assembly 100 preserve the optical performance of optical fibers 102 therein. For instance, the optical fiber(s) of the fiber optic tube assemblies have an optical attenuation of about 0.25 db/km or less at a reference wavelength of 1550 nanometers during standard temperature cycling under GR-20, which cycles temperatures down to −40° C. Furthermore, fiber optic tube assemblies have advantageously been temperature cycled at a reference wavelength of 1550 nanometers down to −60° C. using procedures similar to GR-20 while still having a delta attenuation of about 0.25 db/km or less without having to modify the design.

One factor that can affect optical performance is the maximum particle size, average particle and/or particle size distribution of water-swellable powder 104, which can impact microbending if the optical fibers should contact (i.e., press against) the water-swellable particles. Moreover, using water-swellable powders having relatively small particles improves the transparency of the same to the craft when the tube is opened. The average particle size for the water-swellable powder is preferably about 100 microns or less, but other suitable maximum particles sizes are possible such as 60 microns or less. Using SAPs with a somewhat larger maximum particle size may still provide acceptable performance, but using a larger maximum particle size increases the likelihood of experiencing increased optical attenuation. Additionally, the shape of the particles may also affect the likelihood of experiencing increased optical attenuation. One explanatory water-swellable powder is a crosslinked sodium polyacrylate available from Stockhausen, Inc. of Greensboro, N.C. under the tradename Cabloc GR-211. The particle distribution for this explanatory water-swellable powder is given by Table 1.

TABLE 1

Particle Distribution for an Explanatory Water-Swellable Powder

| Particle Size | Approximate Percentage |
| --- | --- |
| Greater than 63 microns | 0.2% |
| 45 microns-63 microns | 25.7% |
| 25 microns-44 microns | 28.2% |
| Less than 25 microns | 45.9% |

Of course, other water-swellable powders and/or other particle distributions are possible. Another suitable crosslinked sodium polyacrylate is available from Absorbent Technologies, Inc. under the tradename Aquakeep J550P, but other types of water-swellable materials are also possible. By way of example, another suitable water-swellable powder is a copolymer of acrylate and polyacrilamide, which is effective with saline solutions. Furthermore, blends of two or more materials and/or water-swellable powders are possible such as blend of a slow-swelling water swellable powder and a fast-swelling water swellable powder. Likewise, a blend of water-swellable powder can include a first water-swellable powder that is highly-effective for a saline solution and a second water-swellable powder effective for tap water. Blends of the water-swellable powder can also include components that are not inherently water-swellable. By way of example, small amounts of silica such as 1% may be added to a water-swellable powder for improving flow properties and/or inhibiting anti-caking due to moisture absorption.

Another factor that may affect optical performance is excess fiber length (EFL) or excess ribbon length (ERL). As used herein, excess fiber length may refer to either EFL or ERL, but generally speaking ERL merely refers to excess ribbon length. Fiber optic assemblies of the present invention such as shown in FIG. 3 preferably have an excess fiber length that is preferably in the range of about −0.1% to about 0.3% to create acceptable contraction and tensile windows depending on the tube inner diameter, but other suitable values of excess fiber length or excess ribbon length are possible especially with other configurations of fiber optic assemblies.

Furthermore, the present invention can inhibit the sticking between the optical fibers and the tube without using a separation layer or other material. Specifically, fiber optic assemblies can have issues with the optical fibers contacting and sticking to the tube while it is molten state when being extruded about the optical fibers. If the optical fiber sticks to the inside of the tube it can cause the path of the optical fibers to be distorted (i.e., the optical fiber is prevented from moving at that point), which may induce undesirable levels of optical attenuation. As depicted in FIGS. 3 and 4, tube 106 is disposed about optical fibers 102 of fiber optic assembly 100 without using a further material or component as a separation layer (e.g., no gel, grease, yarn, tape, talc, etc.) for inhibiting contact between the optical fibers and the molten tube. Sticking is inhibited because the water-swellable powder is a cross-linked material so it does not promote sticking thereto at typical extrusion temperatures. Thus, water-swellable powder 104 tends to act as a separation layer since it inhibits optical fibers 102 from sticking to the molten tube during manufacture. However, other cable components may be included within the tube or cavity.

Moreover, the water-swellable powder 104 acts to reduce the friction between the optical fibers and the tube or cavity wall by acting as a slip layer. Simply stated, the particles of the water-swellable powder 104 act like ball-bearings between the optical fibers 102 and the inner wall of the tube for reducing the friction therebetween and allowing the optical fibers to move to a "relaxed state". In other variations, embodiments of the present invention may optionally use a lubricant in or on the outer layer of the optical fibers, thereby reducing the risk of optical fibers sticking to the extruded tube and/or reducing the friction therebetween. For instance, optical fibers 102 may include an outer layer such as an ink having a suitable lubricant for inhibiting optical fibers 102 from sticking to the molten tube 106 during extrusion of the same. Suitable lubricants include silicone oil, talc, silica or the like used in a suitable amount that it will inhibit "caking-up" and is disposed in or on the outer layer. Other methods are also available for inhibiting the sticking of optical fibers with the tube. For instance, tube 106 may include one or more suitable fillers in the polymer, thereby inhibiting the adherence of the optical fibers with the tube. Additionally, the use of other polymer materials for the tube such as a highly-filled PVC can inhibit sticking of the optical fibers to the tube. Furthermore, tube 106 may have a dual-layer construction with an inner layer of the tube having one or more suitable fillers in the polymer for inhibiting adhesion. Another way for inhibiting sticking of the optical fibers is to apply a lubricant to the inner wall of the tube or cavity shortly after forming the same.

Tube 106 may use any suitable polymer material for housing and protecting the optical fibers 102 therein. For instance, tube 106 can be a polypropylene (PP), polyethylene (PE), or blends of materials such as a blend of PE and ethylene vinyl acetate (EVA). In other embodiments, tube 106 is formed from a flame-retardant material such as flame-retardant polyethylene, flame-retardant polypropylene, polyvinyl chloride (PVC), or PVDF, thereby forming a portion of a flame retardant fiber optic cable. However, tube 106 need not necessarily be formed from a flame-retardant material for making a flame-retardant fiber optic cable. Generally speaking, all other things being equal tube 106 can have a smaller inner diameter ID compared with dry tube assemblies that include a water-swellable yarn, tape, or thread (i.e., a carrier for the SAP) with the optical fibers. This is because tube 106 does not have to provide the space for both the optical fibers and the carrier of the SAP (i.e., the yarn(s) or tapes); consequently the inner diameter ID may be smaller. For instance, having a smaller inner diameter ID for tube 106 is also advantageous since it allows for a smaller outer diameter, a more flexible assembly having a smaller bend radius (which may reduce kinking), is lighter in weight per length, and can fit longer lengths on a reel.

Illustratively, twelve standard sized 250 micron optical fibers having an overall diameter of about 1.2 millimeters can be housed in a tube or cavity with the inner diameter ID such as about 1.7 millimeters or less such as 1.6 millimeters or even as small as 1.5 millimeters or 1.4 millimeters with suitable performance down to −40° C. Other suitable inner diameters ID for the tube are possible and the ID can depend on the number of optical fibers within the tube or cavity. By way of comparison, a conventional fiber optic assembly with twelve optical fibers and a plurality of water-swellable yarns requires an inner diameter of about 2.0 millimeters to accommodate both the water-swellable yarns and the optical fibers.

Figure 5:
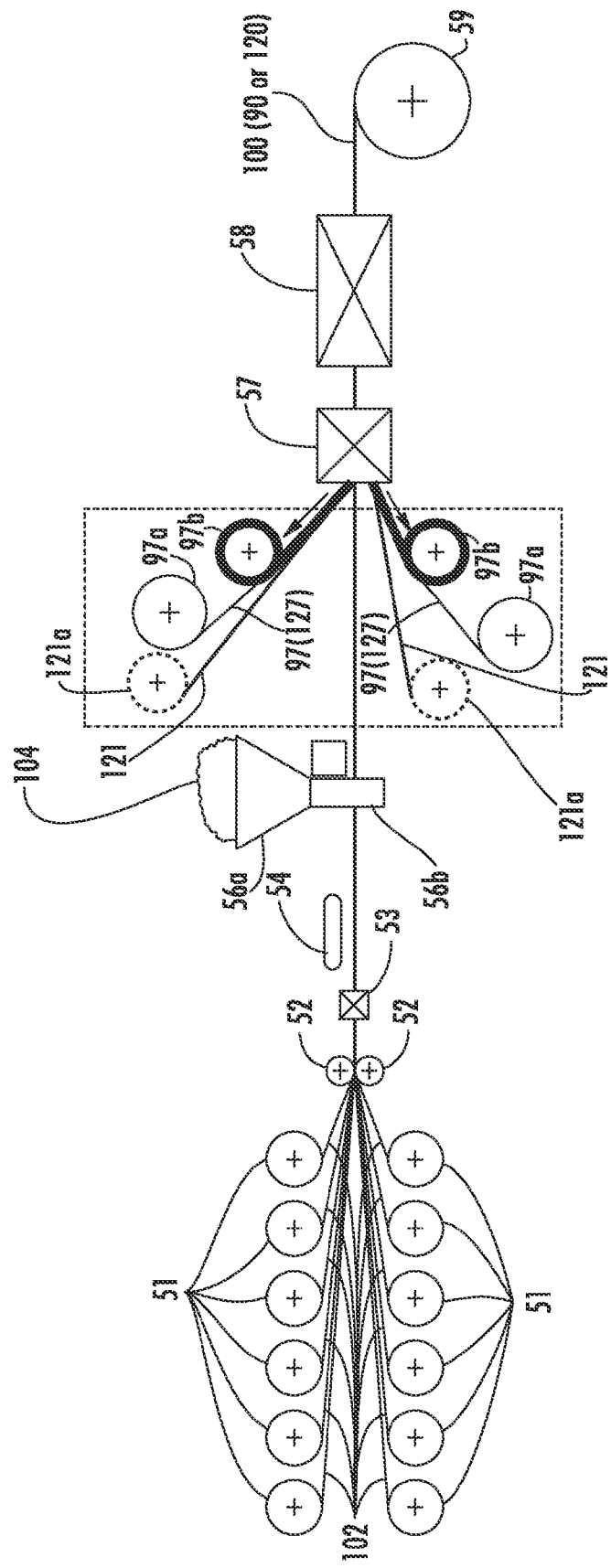
FIG. 5 is a schematic representation of an explanatory manufacturing line for making fiber optic assemblies.

FIG. 5 is a schematic representation of an explanatory manufacturing line for making fiber optic assembly 100 (i.e., a tube assembly) using an electrostatic method according to the present invention. The electrostatic method disclosed herein is advantageous since, generally speaking, it carries the water-swellable powder 104 into the tube or cavity, thereby providing a thin layer of the same on the inner wall, the optical fibers, or other components. Moreover, the water-swellable powder is inhibited from migrating along the tube or cavity as is the case with a direct injection method or fog method (i.e., passing the optical fiber(s) through a cloud of airborne powder), which can move under gravitational forces. As shown, the manufacturing line includes a plurality of reels 51 for paying off a plurality of respective optical fibers 102. This explanatory manufacturing line includes twelve optical fibers 102, but other suitable numbers of optical fibers are possible. Optical fibers 102 leave their respective reels 51 with a positive static charge. The static charges discussed below were measured using a static meter and are merely for explanatory purposes and not limitation. By way of example, the positive static charge on each individual optical fiber 102 is in the range of about +4.5 kV/inch (+1.8 kV/centimeter) to about +5.0 kV/inch (+2.0 kV/centimeter). Then, the optical fibers 102 pass through a set of guide rollers 52 and into a guiding die 53. Thereafter, optical fibers 102 pass by an optional ionizer 54 before the water-swellable powder 104 is applied thereto. Ionizer 54 showers optical fibers 102 with a field of positively and negatively charged ions, thereby reducing the overall positive static charge of optical fibers 102 and stabilizing the process. Illustratively, ionizer 54 reduces the overall positive charge on optical fibers 102 to the range of about +0.6 kV/inch (+0.2 kV/centimeter) to about 0.0 kV/inch (+0.0 kV/centimeter). Then, as best understood, optical fibers 102 pass into a water-swellable powder applicator 56 that applies the water-swellable powder 104 to optical fibers 102 and/or an inner surface of tube 106 using a combination of electrostatic attraction forces and/or mechanical motion.

Specifically, water-swellable powder 104 is loaded into a hopper 56a that uses a vibratory movement to flow the same within a water-swellable powder applicator 56b. The water-swellable powder 104 develops a negative static charge within the water-swellable powder applicator 56 due to interaction between with the water-swellable powder and optical fibers 102. By way of example, the negative static charge on the water-swellable powder 104 is in the range of about −2.8 kV/inch (−1.1 kV/centimeter) to about −6.0 kV/inch (−2.4 kV/centimeter). Consequently, the negatively charged water-swellable powder 104 has an electrostatic attraction force with the slightly positively charged optical fibers 102 and some of the water-swellable powder 104 is transferred to the optical fibers 102. Additionally, the mechanical motion of optical fibers 102 imparts a velocity to water-swellable powder 104, thereby causing water-swellable powder 104 to move in an electrostatically charged cloud of powder about optical fibers 102. After the optical fibers 102 with water-swellable powder 104 exit the water-swellable powder applicator 56 they have an overall electrostatic charge (i.e., the net charge of the optical fibers and the water-swellable powder) of in the range of about +3.1 kV/inch (+1.2 kV/centimeter) to about +4.0 kV/inch (+1.6 kV/centimeter). As the optical fibers 102 with the water-swellable powder 104 exit applicator 56 they enter a tube (not visible) such as a brass tube which guides the same to an extruder 57 and is used for containment of water-swellable powder 104. Optical fibers 102 with the water-swellable powder 104 having the net positive charge enter an extruder 57 that applies the tube 106 about the optical fibers 102 and water-swellable powder 104. Tube 106 is extruded from a polymer such as polypropylene or other suitable polymer, which generally speaking has an inherently neutral charge. As optical fibers 102 and the cloud of negatively charged water-swellable powder 104 enter the tube 106 being applied, the negative charges on the particles of water-swellable powder 104 tend to repulse each other in a generally radially outward direction. Furthermore, the cloud of water-swellable particles 104 is moving forward with the mechanical motion of optical fibers 102, which causes some of the water-swellable particles to impact a cone of a molten polymer that forms tube 106 as it is exiting extruder 57. Specifically, the cone of molten polymer is much larger in diameter as it leaves extruder 57 it moves at a slower speed out of extruder 57 compared with optical fibers 102 and tube 106. As the cone of molten polymer draws down to a near final tube shape, its surface speed increases until it is traveling at the same speed as optical fibers 102. Thus, a combination of mechanical motion of water-swellable powder 104 and electrostatic effects causes water-swellable powder 104 to deposit, in part, on the inner surface of tube 106. Because the inner surface of tube 106 is still molten, water-swellable powder 104 is at least partially transferred and/or attached thereto in a relatively uniform manner. Generally speaking, a ring of water-swellable powder 104 is transferred and/or attached to the inner wall of tube 106 by a mechanical effect (i.e., contact therewith) and/or electrostatic charge. Moreover, the water-swellable powder 104 may also be at least partially attached to the molten polymer of tube 106 before it solidifies. After extrusion, fiber optic assembly 100 is quenched in a water trough 58 and wound onto a take-up reel 59.

Figure 9:
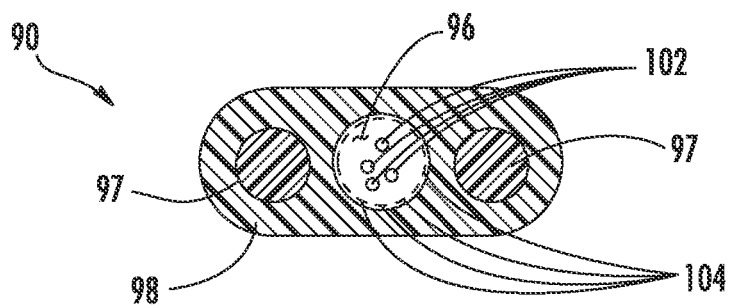
FIG. 9 is a cross-sectional view of another fiber optic cable.
Figure 11:
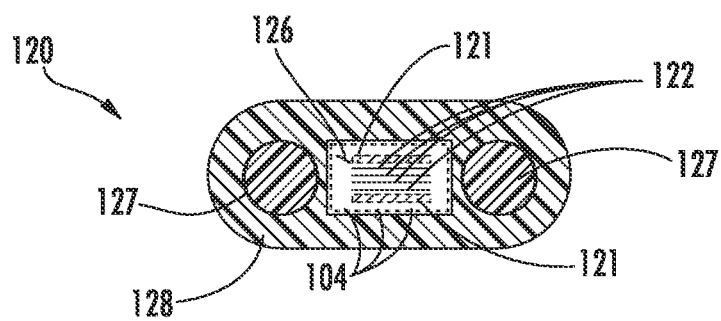
FIG. 11 is a cross-sectional view of another fiber optic cable.

Modifications to this explanatory manufacturing line are possible such as using different ranges for the electrostatic charges and/or introducing other cable components. For example, the manufacturing line could be modified to include applying one or more strength members 97 from one or more respective reels 97a and/or coupling elements 121 from one or more respective reels 121a into extruder 57 as shown in the box with the dashed lines, thereby forming a fiber optic cable such as shown in FIG. 9 or FIG. 11 as discussed below. Additionally, the method for making the fiber optic assembly can be used for applying levels of water-swellable powder that have an average concentration that is greater than 0.02 grams per meter for the tube or cavity. This is because the amount of water-swellable powder needed to effectively water-block may be dependent on the cross-sectional area of the tube or cavity (i.e., the particular fiber optic cable design), where the cavity size may depend on count and configuration of the optical fibers. Further, using the electrostatic application process for applying the relatively low-level (i.e., 0.02 grams per meter for the tube or cavity) of water-swellable powder while providing effective water-blocking is about half of the amount of water-swellable material required if it was applied using direct injection or fog methods.

Figure 6:
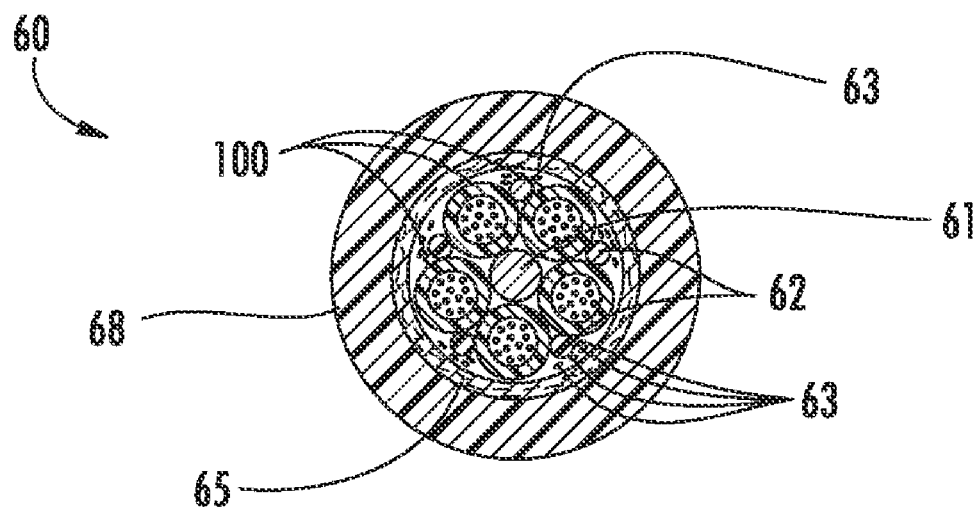
FIG. 6 is a cross-sectional view of a fiber optic cable using the fiber optic assembly of FIG. 3.

FIG. 6 is a cross-sectional view of a fiber optic cable 60 using several fiber optic assemblies 100 according to the present invention. As depicted, fiber optic assemblies 100 are stranded about a central member 61 along with a plurality of filler rods 62 and a plurality of tensile strength yarns 63, which have a water-swellable tape 65 disposed thereabout, thereby forming a fiber optic cable core (not numbered). Fiber optic cable 60 also includes a cable jacket disposed about the cable core for protecting the same. Any suitable strength elements are possible for tensile strength yarns 63 such as aramid yarns, fiberglass, or the like. Fiber optic cable 60 may also include other components such as one or more water-swellable yarns or a water-swellable tape disposed about central member 61. Additionally, fiber optic cable can eliminate elements such as the central member or other cable components if not necessary. Cable jacket 68 of fiber optic cables 60a and 60b may use any suitable material such as a polymer for providing environmental protection.

In one embodiment, cable jacket 68 is formed from a flame-retardant material, thereby making the fiber optic cable flame retardant. Likewise, tube 106 of fiber optic assembly 100 may also be formed from a flame-retardant material, but using a flame-retardant for the tube may not be necessary for making a flame-retardant cable. By way of example, a flame-retardant fiber optic cable may include cable jacket 68 formed from a polyvinylidene fluoride (PVDF) and tube 106 formed from a polyvinyl chloride (PVC). Of course, the use of other flame retardant materials is possible such as flame-retardant polyethylene or flame-retardant polypropylene.

Figure 7:
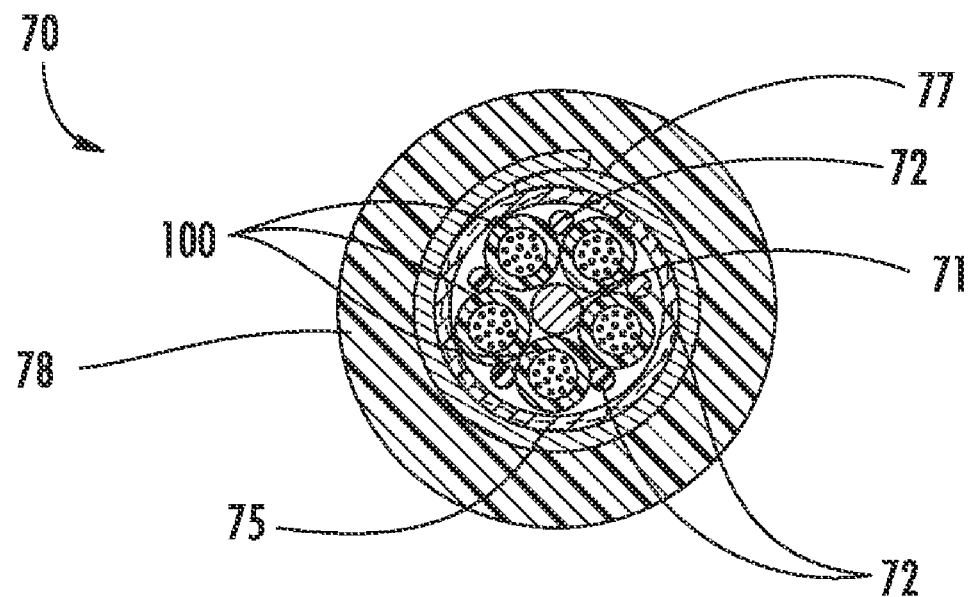
FIG. 7 is a cross-sectional view of another fiber optic cable.

FIG. 7 is a cross-sectional view of a fiber optic cable 70 that is similar to fiber optic cable 60, but it further includes an armor layer 77. Like fiber optic cable 60, fiber optic cable 70 includes a plurality of fiber optic assemblies 100 stranded about a central member 71 along with a plurality of filler rods 72 and a water-swellable tape 75, thereby forming a cable core (not numbered). Armor layer 77 is disposed about water-swellable tape 75 and as shown formed from a metallic material, but other suitable materials may be used for the armor such as a polymer armor. Fiber optic cable 70 also includes a cable jacket 78 disposed about armor layer 77.

Figure 8:
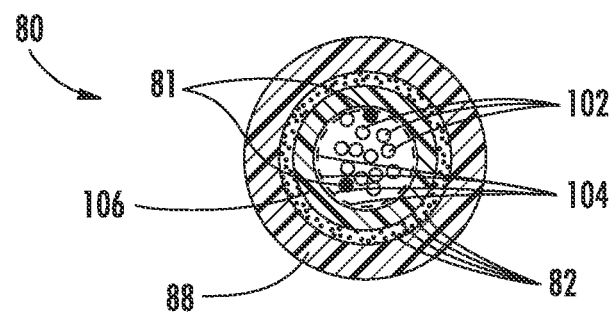
FIG. 8 is a cross-sectional view of another fiber optic cable.

FIG. 8 is a cross-sectional view of another fiber optic cable 80 configured as a monotube fiber optic cable design. More specifically, fiber optic cable 80 includes a single fiber optic assembly (not numbered) similar to fiber optic assembly 100 with optical fibers 102 and water-swellable powder 104 within tube 106, but it further includes a plurality of optional coupling elements 81 for providing a coupling force to optical fibers 102. Since this is a monotube design coupling is not provided by stranding of the fiber optic assemblies like fiber optic cables 60 and 70. Coupling elements 81 can be any suitable construction and/or material such as a string, thread, yarn, tape, elastomer element, or the like that can be wrapped about the optical fiber(s) or longitudinally disposed in the tube or cavity. Other variations for creating coupling include a surface roughness on the inner surface of the tube or cavity or extruding a material on the optical fibers such as an elastomer, fugitive glue or the like. As desired other embodiments may include any other suitable coupling element(s). Fiber optic cable 80 also includes a plurality of strength members 88 such as tensile yarns disposed radially outward of tube 106, but other types of strength members are possible such as GRPs. A cable jacket 88 is disposed about strength members 88 for providing environmental protection.

Although, the previous embodiments depict the fiber optic assembly or fiber optic cable as being round it can have other shapes and/or include other components. For instance, FIG. 9 is a cross-sectional view of a fiber optic cable 90 according to the present invention. Fiber optic cable 90 includes optical fibers 102 and water-swellable powder 104 within a cavity 96 of cable jacket 98, which essentially is a tube for the fiber optic assembly. In this embodiment, cable jacket 98 is non-round and forms the cavity 96 for housing optical fibers 102 and water-swellable powder 104. Simply stated, fiber optic cable 90 is a tubeless configuration since optical fibers 102 can be accessed once cable jacket 98 is opened. Moreover, tube 98 includes strength elements 97 disposed therein (i.e., encapsulated within the cable jacket) and on opposite sides of cavity 96, thereby forming a strengthened tube or cable sheath. Of course, cavity 96 could have other shapes such as generally rectangular to generally conform to the shape of one or more fiber optic ribbons.

As discussed above, FIG. 9 and similar fiber optic cable can be manufactured using the explanatory manufacturing line of FIG. 5. Specifically, since the design is tubeless its manufacturing process advantageously elastically strains the strength members (by providing a tensile force as represented by the arrows) for creating and/or controlling the excess fiber length/excess ribbon length (EFL/ERL) as represented in the dashed box of FIG. 5. Tubeless fiber optic cable 90 has a generally flat shape, but the concepts of elastically stretching the strength members are suitable with any suitable cross-sectional shape for the cable such as round. Specifically, strength members 97 of this explanatory embodiment are GRPs having a plurality of strands 12 held together by a coating and the GRPs have a outer diameter of about 1.6 millimeters, but other sizes for the strength members are possible.

Strength members 97 are paying-off respective reels 97a under a relatively high tension (e.g. between about 100 to about 400 pounds) using respective strength member capstans 97b, thereby elastically stretching strength members 97 (represented by the arrows) so that excess fiber length EFL (or ERL) is produced in the tubeless fiber optic cable 90. In other words, after the tension is released on strength members 97 they return to their original unstressed length (i.e. shorten), thereby producing EFL since the optical fibers were introduced into the fiber optic cable with about the same length as tensioned strength members and the optical fibers were not stretched. Stated another way, the amount of EFL produced is equal to about the strength member strain (i.e., elastically stretching of the strength member) plus any plastic shrinkage of the cable jacket that may occur. The strength member strain can create a significant amount of EFL or ERL in a one-pass production such as 10% or more, 25% or more, 50% or more, and even up to 80% or more of the total EFL or ERL within the cable. Furthermore, elastically stretching of the strength member is advantageous since it allows for a precise control of the amount of EFL or ERL being introduced into the cable and greatly reduces strength member pistoning since the finished cable jacket is in compression instead of tension. For the manufacture of tubeless fiber optic cable 90, about 95% of EFL is introduced into the cable by elastically stretching the strength members. As shown by FIG. 5, the cable jacket (i.e., the tube) is being applied about the optical fibers, water-swellable powder and strength members by cross-head extruder 57 while strength members 97 are elastically stretched. After extrusion, cable 90 is then quenched in water trough 58 while the strength member is still elastically stretched, thereby allowing the cable jacket to "freeze" on the stretched strength members. Tubeless fiber optic cable 90 is then pulled through the manufacturing line using one or more caterpullers (not shown) and then wound onto take-up reel 59 under low tension (i.e., the tensile force that elastically stretched the strength members is released and strength members return to a relaxed length thereby creating ERL or EFL in the cable). Of course, this is merely an explanatory manufacturing line and other modifications are possible.

Figure 10:
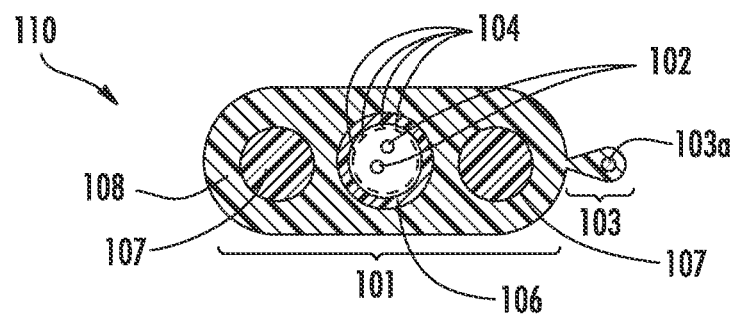
FIG. 10 is a cross-sectional view of another fiber optic cable.

FIG. 10 depicts a cross-sectional view of a fiber optic cable 110 having a main cable body 101 and a tonable lobe 103. Fiber optic cable 110 includes a fiber optic assembly 100 having optical fibers 102 and water-swellable powder 104 within tube 106. Fiber optic cable 110 may also include one or more water-swellable yarns (not visible) or a water-swellable tape disposed about tube 106 for blocking the migration of water along the fiber optic cable outside fiber optic assembly 100. Fiber optic cable 110 also includes a plurality of strength members 107 such as GRPs disposed on opposite sides of tube 106. Although strength members 107 are shown slightly spaced apart from tube 106 they may contact the same. Moreover, other materials are possible for strength members 107 such as steel wires or other suitable components. Fiber optic cable 110 also includes a cable jacket 108 formed from a suitable polymer, which forms a portion of main cable body 101 and tonable lobe 103 as shown. Tonable lobe 103 includes a toning wire 103a that is a suitable conductive element such as a copper wire or copper clad steel wire suitable for sending a signal for locating fiber optic cable 110 when buried. By way of example, toning wire 103a is a 24 AWG gauge copper wire. Additionally, toning lobe 103 has a frangible web (not numbered) for separating the same from the main cable body 101 when desired such as before connectorization. Of course, other variations are possible.

FIG. 11 depicts a cross-sectional view of a fiber optic cable 120 that is a tubeless configuration having a plurality of fiber optic ribbons 122 therein as represented by the horizontal lines. Although fiber optic cable 120 is shown as a generally flat cable design it could have other suitable shape such as variation of a flat cable or a round cable. As discussed above, the manufacture of fiber optic cable 120 is similar to the manufacture of fiber optic cable of FIG. 9 using the explanatory manufacturing line of FIG. 5 with the addition of one or more reels 121a for applying one or more respective coupling elements. However, instead of reels 51 having individual optical fibers 12, the desired number of reels 51 would each have a fiber optic ribbon with each ribbon having a plurality of optical fibers 12 therein. Fiber optic ribbons include a plurality of optical fibers (not visible) attached together using a suitable matrix material such as a UV curable matrix. Specifically, fiber optic cable 120 includes four fiber optic ribbons 122 each having twenty-four optical fibers for a total of ninety-six optical fibers, thereby forming a ribbon stack (not numbered). Similar fiber optic cables can have other fiber-counts within the ribbon and/or the fiber optic cable. As described above, fiber optic cable 120 includes a relatively small amount of water-swellable powder 104 that, generally speaking is at least partially disposed on the inner surface of a cavity 126 of a cable jacket 128 (that acts as a tube for the assembly) and/or on the fiber optic ribbon(s). For instance, water-swellable powder 104 has a normalized concentration of about 0.01 grams or less per meter for each square millimeter of cavity 126 of the fiber optic assembly, but other suitable amounts may be used. By way of example, cavity 126 is sized to receive fiber optic ribbons (i.e., fiber optic components) and has a cavity width measured in millimeters and a cavity height measured in millimeters, which are multiplied together to calculate a cavity cross-sectional area in square millimeters. The stack of fiber optic ribbons also has a total cross-sectional area measured in square millimeters. The average concentration of water-swellable powder may be calculated using the cavity cross-sectional area or an effective cavity cross-sectional area. The effective cavity cross-sectional area is defined as the cavity cross-sectional area minus the cross-sectional area of the desired components therein such as the fiber optic ribbons within the cavity. Illustratively, an effective cross-sectional is calculated by subtracting the cross-sectional area of the fiber optic ribbons from the cavity cross-sectional area, which yields an effective cavity cross-sectional area in square millimeters. Thus, an average concentration for the amount of water-swellable powder in this design is calculated by taking the desired normalized concentration (grams per meter length of the assembly per square millimeter of the cavity) times the effective cavity cross-sectional area (square millimeters), which yields an average concentration for the water-swellable powder in grams per meter length of the assembly.

Additionally, fiber optic cable 120 may optionally include one or more coupling elements 121 as shown in phantom lines. When including one or more coupling elements 121 less of water-swellable powder 104 may be transferred to an inner surface of cavity 126 since the coupling elements 121 can inhibit the transfer (i.e., they are between a portion of the fiber optic ribbons and the cavity walls). More specifically, fiber optic cable 120 has two coupling elements (represented by the shaded rectangles) formed from a longitudinal foam tape, or other suitable coupling element disposed on opposite sides of the ribbon stack so that the coupling elements 121 sandwich the fiber optic ribbons 122 therebetween. Below is representative example to determine the average concentration of water-swellable powder using the effective cavity cross-sectional area for a larger cavity having fiber optic ribbons and coupling elements therein. In this instance, cavity 126 is sized to receive four twenty-four fiber optic ribbons (i.e., fiber optic components) and has a cavity width of about 8.2 millimeters and a cavity height of 5.2 millimeters, which are multiplied together to calculate a cavity cross-sectional area of about 43 square millimeters. The stack of fiber optic ribbons also have a total cross-sectional area of about 7.4 square millimeters and the sum of the coupling elements have a cross-sectional area of about 27.2 square millimeters. Thus, the effective cross-sectional for this example is calculated by subtracting the cross-sectional area of the fiber optic ribbons and coupling elements from the cavity cross-sectional area (i.e., 43 mm$^2$–7.4 mm$^2$–27.2 mm$^2$), which yields an effective cavity cross-sectional area of about 8 square millimeters. Thus, an average concentration for the amount of water-swellable powder for this design is calculated by taking the desired the normalized concentration times the effective cavity cross-section (i.e., 0.01 grams per meter length per square millimeter times 8 square millimeters), which yields an average concentration of about 0.08 grams per meter length for the cavity of the example that houses 96-optical fibers in a ribbon stack. Although, the average concentration of water-swellable powder is larger it still is a trace amount for water-blocking a larger effective cavity cross-sectional area, which is hardly noticeable by the craft and still effectively blocks the migration of water along the cavity of the fiber optic cable. Of course, other examples according to these concepts of the invention are possible.

Additionally, coupling elements 121 provide the optical fibers for this design with a coupling force of at least about 0.1625 Newtons per optical fiber for a thirty-meter length of fiber optic cable provided one or more coupling elements 121. Illustratively, a fiber optic cable having a single ribbon with twelve optical fibers in the ribbon should have a coupling force of about 1.95 Newtons or greater for a thirty-meter length of fiber optic cable. Likewise, a similar fiber optical cable having a single optical fiber ribbon with four optical fibers should have a coupling force of about 0.650 Newtons or greater for a thirty-meter length of fiber optic cable. Measurement of the coupling force is accomplished by taking a thirty-meter fiber optic cable sample and pulling on a first end of the optical fibers (or fiber optic ribbon(s)) and measuring the force required to cause movement of the second end of the optical fiber(s) (or fiber optic ribbon(s)). In other words, the excess fiber length (EFL), or excess ribbon length (ERL), must be straightened so that the coupling force is the amount of force required to move the entire length of optical fibers within the thirty-meter fiber optic cable sample. Besides providing coupling, coupling elements 121 can also cushion the ribbon stack, while still allowing movement of the fiber optic ribbons.

Fiber optic ribbons 122 of this design generally have more ERL than tube designs since the ribbon stack is not stranded. By way of example, fiber optic ribbons 122 have an ERL in the range of about 0.1% to about 1.2% or more and the amount of ERL can depend on the number of fiber optic ribbons within the stack and the strength members would be elastically stretched in a range similar to the desired ERL. Moreover, fiber optic cable 120 can use a manufacturing process similar to that described with respect to fiber optic cable 90 to elastically stretch one or more strength members 127, thereby creating the ERL. Specifically, a first strength member 127 and a second strength member 127 that are disposed on opposite sides of cavity 126 are elastically stretched by a predetermined amount during the extrusion of cable jacket 128. Furthermore, fiber optic cable 120 can be a portion of a distribution fiber optic assembly having one or more optical fibers split out for distribution. The optical fibers split out for distribution can be spliced with a tether, attached to a ferrule/connector, or merely be left splice ready for the craft.

Many modifications and other embodiments of the present invention, within the scope of the claims will be apparent to those skilled in the art. For instance, the concepts of the present invention can be used with any suitable fiber optic cable design and/or method of manufacture. For instance, the embodiments shown can include other suitable cable components such as an armor layer, coupling elements, different cross-sectional shapes, or the like. Thus, it is intended that this invention covers these modifications and embodiments as well those also apparent to those skilled in the art.

We claim:

1. A method of making a fiber optic assembly, comprising:
providing at least one optical fiber;
applying a water-swellable powder to the at least one optical fiber; and
applying a tube about the at least one optical fiber and the water-swellable powder,
wherein the water-swellable powder has an average concentration of about 0.02 grams or less per meter of the tube and has a normalized concentration of 0.01 grams or less per meter of the assembly per square millimeter of cavity cross-sectional area within a cavity of the tube, and wherein some of the water-swellable powder is transferred to a portion of a wall of the tube that is at least partially molten.

2. The method of claim 1, wherein the at least one optical fiber passes an ionizer to reduce an overall positive charge on the at least one optical fiber.

3. The method of claim 1, wherein applying the water-swellable powder provides a negative charge to the water-swellable powder so that it is in part attracted to the optical fiber by electrostatic force.

4. The method of claim 3, further comprising:
providing a first strength member and a second strength member; and
elastically straining both the first strength member and the second strength member while applying the tube for creating a predetermined level of excess fiber length, wherein
the tube is attached to both the first strength member and the second strength member.

5. The method of claim 1, further comprising providing at least one strength member.

6. The method of claim 1, further comprising:
providing a first strength member and a second strength member; and
elastically straining both the first strength member and the second strength member while applying the tube for creating a predetermined level of excess fiber length, wherein
the tube is attached to both the first strength member and the second strength member.

7. The method of claim 1, wherein providing at least one optical fiber comprises providing a fiber optic ribbon.

8. The method of claim 7, further comprising:
providing a first strength member and a second strength member;
elastically straining both the first strength member and the second strength member while applying the tube for creating a predetermined level of excess ribbon length, wherein the tube is attached to both the first strength member and the second strength member; and
providing a first coupling element and a second coupling element wherein the fiber optic ribbon is disposed between the first coupling element and the second coupling element.

9. The method of claim 1, wherein the water-swellable powder comprises a blend of two or more different types of materials.

* * * * *